United States Patent [19]

Livingston

[11] 4,067,133
[45] Jan. 10, 1978

[54] FISHING POLE ADAPTOR KIT

[76] Inventor: Cecil E. Livingston, 1920 Chanslor Ave., Richmond, Calif. 94801

[21] Appl. No.: 711,600

[22] Filed: Aug. 4, 1976

[51] Int. Cl.² ............................................. A01K 87/00
[52] U.S. Cl. .................................................... 43/18 R
[58] Field of Search ....................................... 43/18 R

[56] References Cited

U.S. PATENT DOCUMENTS

| | | | |
|---|---|---|---|
| 1,527,463 | 2/1925 | Bastman | 43/18 R |
| 2,566,647 | 9/1951 | Wissman | 43/18 R |
| 3,121,290 | 2/1964 | Brown | 43/18 R |

Primary Examiner—Russell R. Kinsey
Assistant Examiner—Daniel J. Leach
Attorney, Agent, or Firm—Bielen and Peterson

[57] ABSTRACT

A fishing pole adaptor kit for changing a long casting pole having detachable sections into a short deep sea pole, the kit including a plurality of adaptor couplers and a plurality of short pole extensions. The adaptor couplers each have a different dimensioned first end coupling structure to enable coupling to a variety of different sized conventional pole couplers and a fixed dimension second end for connecting one of the plurality of different length pole extensions.

2 Claims, 4 Drawing Figures

U.S. Patent  Jan. 10, 1978  4,067,133
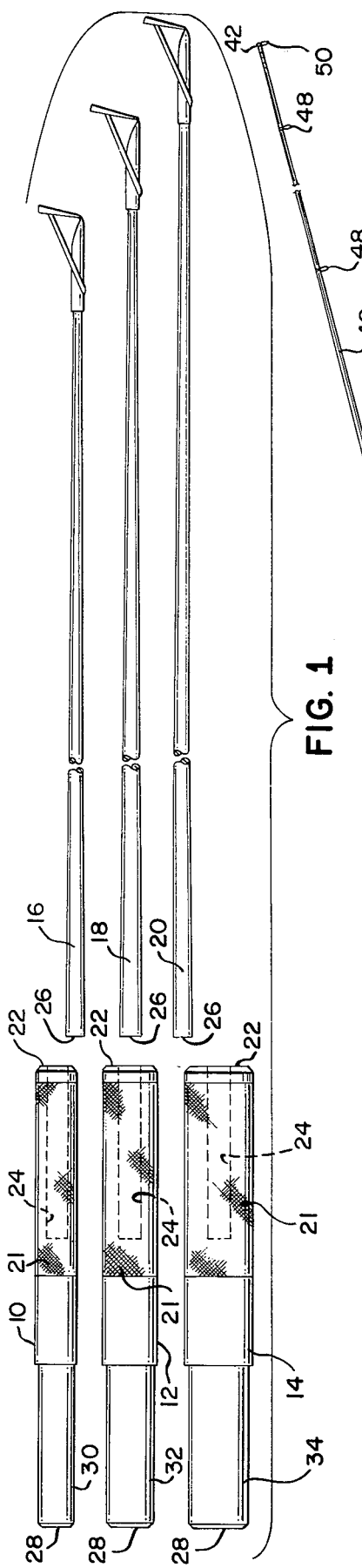
FIG. 1
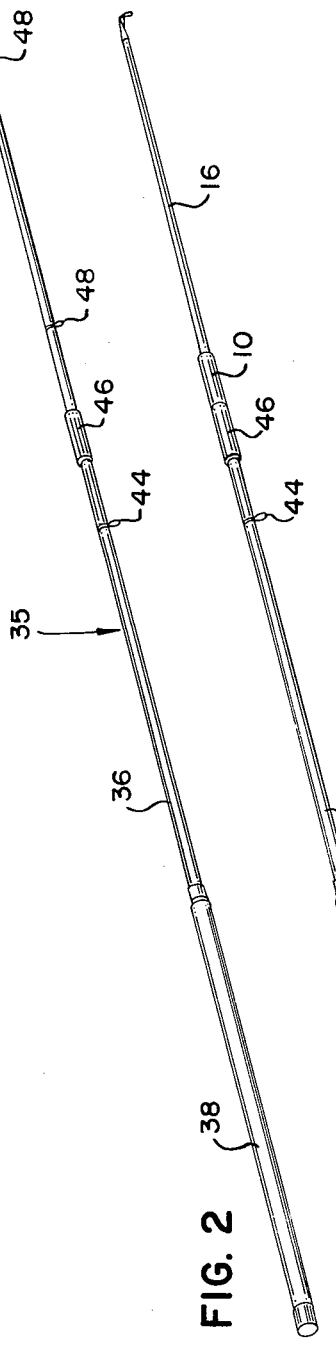
FIG. 2
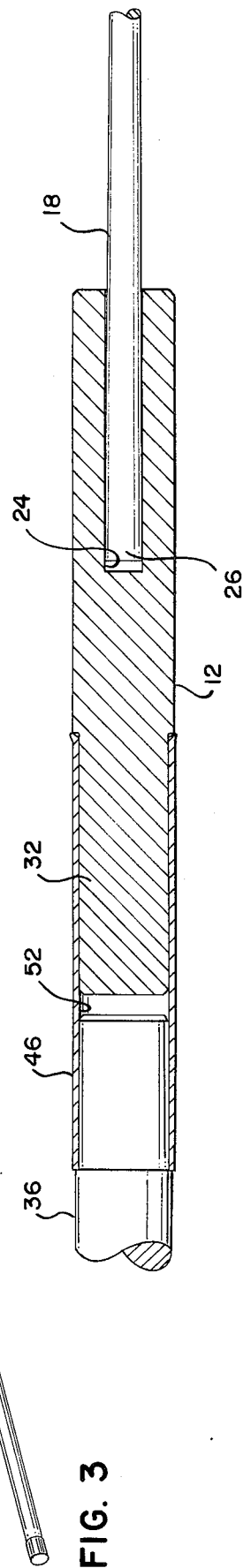
FIG. 3
FIG. 4

FISHING POLE ADAPTOR KIT

BACKGROUND OF THE INVENTION

This invention relates to an adapter kit for fishing poles to convert long segmented casting poles into short deep sea poles. Surf casting poles are usually heavy duty poles coming in lengths of 8 to 12 feet and are frequently segmented in approximately four foot lengths for convenient portage and storage. As is often the case with fishing, conditions may change the type of fishing from that originally planned. In order to provide for such contengencies applicant has devised an adoptor kit for converting a long casting pole into a short deep sea pole. Preferably the components of the kit are constructed of inexpensive materials since it is contemplated that the kit be a temporary substitute rather than a replacement for the shorter deep sea pole. Further, since there are multiple sizes for the socket connectors for segmented casting poles of different manufacturers, a plurality of adaptor connectors must be included to provide for the correctly matching adaptor. Similarly, since the butt or reel portion of segmented casting poles may vary in length between different manufacturers, a plurality of short end sections or pole tips of different length, which are interchangeably insertable in the various adoptors, should be provided to coact with the reel portion of the pole to form a pole of appropriate length for a deep sea pole. In order that the convenience be not outweighed by the expense, the adaptors and substitute pole tips should be fabricated from an inexpensive material.

SUMMARY OF THE INVENTION

The adaptor kit of this invention enables a long segmented surf casting pole to be converted into a short deep sea pole by the use of adaptor couplers and short pole extensions. A segmented surf casting pole is constructed in two or more sections with socket type connections coupling the sections together. While ideal for surf casting, the length and flexibility of the casting pole make it unsuitable for deep sea fishing where a shorter more rigid pole is desired. The adoptor kit of applicant's invention provides a plurality of tip sections which are both shorter and more rigid than the tip section of the casting pole. These tip sections by use of one of a plurality of adoptor connectors included in the adaptor kit, are coupled to the butt or handgrip section of the casting pole to form a shorter more rigid deep sea pole. The adaptor connectors each have one end with a common sized socket for insertion of a selected tip section and a second end sized to fit a select variety of different standard socket connectors on existing poles. In this manner a casting pole can be easily converted to a deep sea pole by detaching the tip section or distal end sections of the pole and installing an adapter coupling with a suitable substitute tip section from the kit. These and other features will become apparent from a detailed description of the preferred embodiment.

BRIEF DESCRIPTION OF THE DRAWINGS

FIG. 1 is a side view of a plurality of adaptor connectors and accompanying pole tip sections comprising the fishing pole adaptor kit.

FIG. 2 is a perspective view of a conventional surf casting fishing pole.

FIG. 3 is a perspective view of a portion of the pole of FIG. 2 with attached items from the adaptor kit.

FIG. 4 is an enlarged cross sectional view of a portion of the adaptor kit and pole of FIG. 3.

DETAILED DESCRIPTION OF THE PREFERRED EMBODIMENTS

Referring to FIG. 1, a view of the components of the adaptor kit illustrates the preferred embodiment for the convenience of the users. Shown in FIG. 1 are three adaptor couplers, 10, 12, and 14, of different diameter and three pole tip sections, 16, 18 and 20 of different length.

The adaptor couplers each have a receptacle end 22 with a preferably knurled surface 21 and a socket 24 having a common inside diameter. This permits the base ends 26 of the pole tips, which similarly have a common outside diameter, to interchangeably fit with a snug sliding engagement within the sockets. The adaptor couplers also have a pole connector end 28 with a cylindrical, projecting shaft suitable for insertion in a ferrule coupler of a conventional pole. Because the couplers of poles of different manufacturers may differ in size, each of the adaptor couplers has a different diameter shaft, 30, 32, and 34. The diameters are selected according to the prevalent standard sizes of the pole couplers. It has been found that three different sized shafts will provide the necessary coupling for the major portion of available casting poles.

Referring to FIG. 2, a conventional surf casting pole 35 is shown having a butt section 36 with a hand grip portion 38 suitable for mounting a reel (not shown). The butt section is coupled to a rod extension section 40 which terminates at what is known in the art as a tip top 42. The rod extension section may be formed of multiple sections coupled together, however, for ease of description a single extension section is described and shown. The length of the casting pole is approximately 8 – 12 feet and is at the tip top end, appreciably flexible. On the butt section 36, is a butt guide 44 for line and a ferrule coupler 46, which couples the extension section 40 to the butt section. A series of line guides 48 are arranged along the extension section 40 to a tip top guide 50. The extension section 40 is separable from the butt section 36 at the ferrule coupler 46 to allow a more compact storage and portage of the pole.

Referring to FIG. 3, the butt section 36 of the pole is shown without the extension section 40 and with a substitute tip section 16 selected from the tip section 16, 18 and 20 of FIG. 1. The tip section 16 is attached to the butt section of the pole by an adaptor coupler 10 selected from the couplers 10, 12 and 14 of FIG. 1 to insert into the ferrule coupler 46 at the end of the butt section 36. The length of the altered pole is approximately 5 feet. The tip section 16 is constructed with substantially less flexibility than the portion of the original extension section of the pole, to make the altered pole more suitable for deep sea fishing rather than casting. The butt guide 44 and a tip guide 52 are sufficient to guide the line during fishing.

In FIG. 4, a coupling arrangement is shown in cross section for greater clarity. The ferrule coupler 46 is rigidly fixed to the end of the butt section 36 of the pole. The ferrule coupler 46 forms a socket 52 into which an extension section or adaptor coupler is insertable. In FIG. 4, a selected adaptor coupler 12 has its shaft 32 inserted snugly into the socket 52. The distal end of the adaptor coupler 12 includes a socket 24 into which a selected pole tip section 18 is snugly inserted. Since all of the sockets 24 on the couplers are the same, the pole tip section can be selected according to length to provide the adapted pole with a suitable total length.

As mentioned, the coupler shafts are sized according to the prevalent ferrule couplers of conventional poles and are preferably ½ inches, ⅝ inches, and ¾ inches in diameter. The couplers and pole tip sections are also preferably fabricated from a strong plastic or nylon material to be inexpensive as well as functional.

While in the foregoing specification embodiments of the invention have been set forth in considerable detail for purposes of making a complete disclosure of the invention, it will be apparent to those skilled in the art that numerous changes may be made in such details without departing from the spirit and principles of the invention.

What is claimed is:

1. A fishing pole adaptor kit for conventional long casting poles, having a butt section with a socket connector and at least one extension section insertable in the socket connector, said kit converting the casting poles into short deep sea poles, the kit comprising:
   a plurality of adaptor couplers each having a first shaft end insertable into the socket connector and having a second receptacle end with a socket wherein each first shaft end is of different diameter and each second receptacle end is of identical diameter; and
   a plurality of pole tip sections of different lengths each having a first end snugly insertable into said socket of said receptacle end of said adaptor coupler and each having a second distal end with a line guide tip.

2. The fishing pole adaptor kit of claim 1 wherein the diameters of said first shaft ends are selected according to prevalent sizes of socket connectors on conventional poles.

* * * * *